United States Patent
Bannon et al.

(10) Patent No.: US 10,671,349 B2
(45) Date of Patent: Jun. 2, 2020

(54) ACCELERATED MATHEMATICAL ENGINE

(71) Applicant: Tesla, Inc., Palo Alto, CA (US)

(72) Inventors: Peter Joseph Bannon, Woodside, CA (US); Kevin Altair Hurd, Redwood City, CA (US); Emil Talpes, San Mateo, CA (US)

(73) Assignee: Tesla, Inc., Palo Alto, CA (US)

( * ) Notice: Subject to any disclaimer, the term of this patent is extended or adjusted under 35 U.S.C. 154(b) by 71 days.

(21) Appl. No.: 15/710,433

(22) Filed: Sep. 20, 2017

(65) Prior Publication Data

US 2019/0026078 A1   Jan. 24, 2019

Related U.S. Application Data

(60) Provisional application No. 62/536,399, filed on Jul. 24, 2017.

(51) Int. Cl.
| | | |
|---|---|---|
| *G06K 9/00* | (2006.01) | |
| *G06F 7/575* | (2006.01) | |
| *G06T 1/20* | (2006.01) | |
| *G06F 15/80* | (2006.01) | |
| *G06F 7/52* | (2006.01) | |
| *G06F 7/50* | (2006.01) | |

(Continued)

(52) U.S. Cl.
CPC ............... *G06F 7/575* (2013.01); *G06F 7/50* (2013.01); *G06F 7/52* (2013.01); *G06F 7/5443* (2013.01); *G06F 15/80* (2013.01); *G06F 17/16* (2013.01); *G06N 3/0454* (2013.01); *G06N 3/063* (2013.01); *G06T 1/20* (2013.01)

(58) Field of Classification Search
CPC .......... G06F 7/575; G06F 7/5443; G06F 7/52; G06F 7/50; G06F 15/80; G06T 1/20
See application file for complete search history.

(56) References Cited

U.S. PATENT DOCUMENTS

| | | |
|---|---|---|
| 5,311,459 A | 5/1994 | D'Luna et al. |
| 5,471,627 A | 11/1995 | Means et al. |

(Continued)

FOREIGN PATENT DOCUMENTS

| | | |
|---|---|---|
| EP | 0422348 A2 | 4/1991 |
| WO | 2014025765 A2 | 2/2014 |

(Continued)

OTHER PUBLICATIONS

Author Unknown, "Accumulator (computing)", Wikipedia, Version from Jul. 14, 2017 (Year: 2017).*

(Continued)

*Primary Examiner* — Aaron W Carter
(74) *Attorney, Agent, or Firm* — Knobbe, Martens, Olson & Bear, LLP (57) ABSTRACT

Various embodiments of the disclosure relate to an accelerated mathematical engine. In certain embodiments, the accelerated mathematical engine is applied to image processing such that convolution of an image is accelerated by using a two-dimensional matrix processor comprising subcircuits that include an ALU, output register and shadow register. This architecture supports a clocked, two-dimensional architecture in which image data and weights are multiplied in a synchronized manner to allow a large number of mathematical operations to be performed in parallel.

21 Claims, 10 Drawing Sheets (51) Int. Cl.
*G06N 3/063* (2006.01)
*G06N 3/04* (2006.01)
*G06F 7/544* (2006.01)
*G06F 17/16* (2006.01)

(56) References Cited

U.S. PATENT DOCUMENTS

| | | | |
|---|---|---|---|
| 5,600,843 | A | 2/1997 | Kato et al. |
| 5,717,947 | A | 2/1998 | Gallup et al. |
| 6,195,674 | B1* | 2/2001 | Elbourne ............ G06F 9/3879 708/401 |
| 8,924,455 | B1 | 12/2014 | Barman et al. |
| 9,697,463 | B2* | 7/2017 | Ross .................... G06N 3/0454 |
| 10,074,051 | B2* | 9/2018 | Thorson .................. G06N 3/08 |
| 2005/0125369 | A1 | 6/2005 | Buck et al. |
| 2009/0192958 | A1 | 7/2009 | Todorokihara |
| 2010/0017351 | A1 | 1/2010 | Hench |
| 2011/0029471 | A1 | 2/2011 | Chakradhar et al. |
| 2011/0239032 | A1 | 9/2011 | Kato et al. |
| 2012/0017066 | A1 | 1/2012 | Vorbach et al. |
| 2012/0323832 | A1 | 12/2012 | Snook et al. |
| 2014/0089232 | A1 | 3/2014 | Buibas et al. |
| 2014/0142929 | A1 | 5/2014 | Seide et al. |
| 2014/0180989 | A1 | 6/2014 | Krizhevsky et al. |
| 2014/0277718 | A1 | 9/2014 | Izhikevich et al. |
| 2014/0351190 | A1 | 11/2014 | Levin et al. |
| 2015/0046332 | A1 | 2/2015 | Adjaoute |
| 2016/0342889 | A1 | 11/2016 | Thorson et al. |
| 2016/0342891 | A1 | 11/2016 | Ross et al. |
| 2016/0342892 | A1 | 11/2016 | Ross |
| 2016/0342893 | A1 | 11/2016 | Ross et al. |
| 2016/0379109 | A1 | 12/2016 | Chung et al. |
| 2017/0103298 | A1* | 4/2017 | Ling ...................... G06N 3/063 |
| 2017/0103299 | A1* | 4/2017 | Aydonat .................. G06N 3/063 |
| 2017/0277658 | A1* | 9/2017 | Pratas .................... G06F 17/153 |
| 2018/0032857 | A1* | 2/2018 | Lele ......................... G06N 3/04 |
| 2018/0157961 | A1* | 6/2018 | Henry .................... G06N 3/063 |
| 2018/0157962 | A1* | 6/2018 | Henry .................... G06N 3/063 |
| 2018/0157966 | A1* | 6/2018 | Henry .................... G06N 3/063 |
| 2018/0189633 | A1* | 7/2018 | Henry .................... G06N 3/0445 |
| 2018/0189639 | A1* | 7/2018 | Henry .................... G06N 3/063 |
| 2018/0189640 | A1* | 7/2018 | Henry .................... G06N 3/063 |
| 2018/0189651 | A1* | 7/2018 | Henry .................... G06N 3/082 |
| 2018/0197067 | A1* | 7/2018 | Mody .................... G06F 7/5443 |
| 2018/0247180 | A1* | 8/2018 | Cheng .................. G06K 9/4628 |
| 2019/0026078 | A1* | 1/2019 | Bannon .................... G06F 7/575 |
| 2019/0026237 | A1* | 1/2019 | Talpes .................. G06F 13/1663 |
| 2019/0026249 | A1* | 1/2019 | Talpes .................... G06F 7/5443 |
| 2019/0026250 | A1* | 1/2019 | Das Sarma ........ G06F 15/8053 |
| 2019/0311253 | A1* | 10/2019 | Chung ................ G06F 15/7803 |
| 2019/0370645 | A1* | 12/2019 | Lee ......................... G06N 3/04 |

FOREIGN PATENT DOCUMENTS

| | | |
|---|---|---|
| WO | 2016099779 A1 | 6/2016 |
| WO | 2016186811 A1 | 11/2016 |
| WO | 2016186823 A1 | 11/2016 |
| WO | 2017117186 A1 | 7/2017 |

OTHER PUBLICATIONS

Sato, Kaz; Young, Cliff; Patterson, David "An in-depth look at Google's first Tensor Processing Unit (TPU)", posted in Google Cloud Big Data and Machine Learning Blog, posting date May 12, 2017. Available from Internet, <URL: https://cloud.google.com/blog/big-data/>, (22 pgs).

Kung S: "VLSI Array processors", IEEE ASSP Magazine, IEEE US, vol. 2, No. 3, Jul. 1985 (1 pg).

Krizhevsky, Alex; Sutskever, Ilya; Hinton Geoffrey E.; "ImageNet Classification with Deep Convolutional Neural Networks", The 26th annual conference on Neural Information Processing Systems: Dec. 3-8, 2012. Available from Internet, <http://papers.nips.cc/book/advances-in-neural-information-processing-systems-25/2012>, (9 pgs).

Kim, Sang Kyun; Mcmahon, Peter L.; Olukotun, Kunle, "A Large-scale Architecture for Restricted Boltzmann Machines", Department of Electrical Engineering Stanford University, 2010 18th IEEE Annual International Symposium on, IEEE, Piscataway, NJ, USA, May 2, 2010, (8 pgs).

Cornu, Thierry; Ienne, Paolo; Niebur, Dagmar; Thiran, Patrick; Viredaz, Marc A, "Design, Implementation, and Test of a Multi-Model Systolic Neural-Network Accelerator", Scientific Programming-Parallel Computing Projects of the Swiss Priority Programme, vol. 5, No. 1, Jan. 1, 1996, (14 pgs).

International Search Report dated Oct. 1, 2018, in International Patent Application No. PCT/US18/42959, filed Jul. 19, 2018 (2 pgs).

Written Opinion of the International Searching Authority dated Oct. 1, 2018, in International Patent Application No. PCT/US18/42959, filed Jul. 19, 2018 (8 pgs).

* cited by examiner

ACCELERATED MATHEMATICAL ENGINE

CROSS-REFERENCE TO RELATED APPLICATION

This application claims the priority benefit under 35 USC § 119(e) to U.S. Prov. Pat. App. Ser. No. 62/536,399 (20150-2154P (P0822-1PUS)), filed on Jul. 24, 2017, entitled "Accelerated Mathematical Engine," and listing Peter Joseph Bannon, Kevin Altair Hurd, and Emil Talpes as inventors. The aforementioned patent document is incorporated by reference herein in its entirety and for all purposes.

BACKGROUND

A. Technical Field

The present disclosure relates to an accelerated mathematical engine for operating on large amounts of data, and more particularly, to an accelerated mathematical engine for performing complex convolution operations based on matrix multiply operations.

B. Description of the Related Art

One skilled in the art will recognize the ever-increasing demands of speed and performance on general processors and systems that are used to implement time-sensitive and complex mathematical operations. As these general systems are used to process large amounts of data and perform complex mathematical operations, the computational resources and the rate of calculations are limited by the capabilities of existing general hardware designs that perform those calculations. For example, general-purpose computing devices and processors that execute matrix operations may be unable to perform these operations in a timely manner under certain circumstances. Many conventional multipliers that perform digital signal processing operations rely on a series of software and hardware matrix manipulation steps (address generation, transpositions, bit-by-bit addition and shifting, etc.) and may represent a bottleneck within a time-sensitive system. Oftentimes, these manipulation steps require the use of a processor's arithmetic functions to generate intermediate results at the expense of wasting computing time due to the added steps of storing and fetching intermediate results from various locations to complete an operation.

Figure 1:
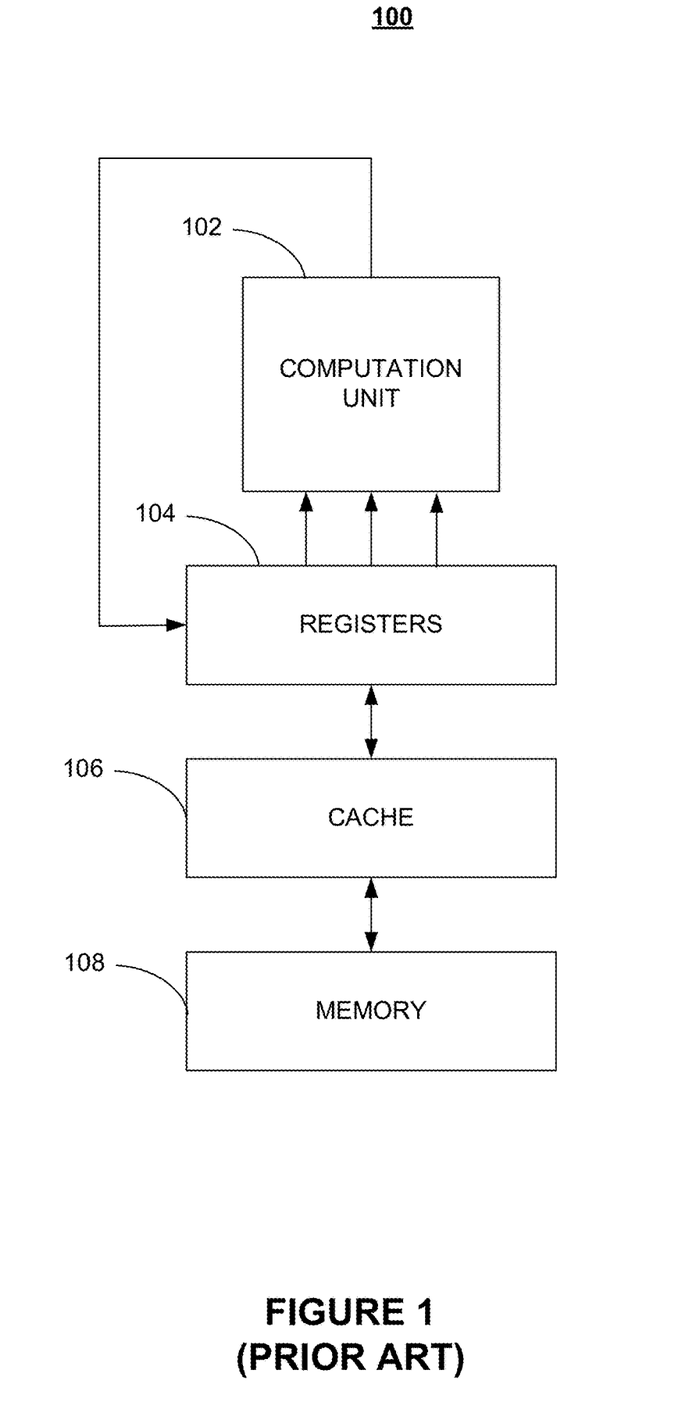
FIG. 1 shows an example of a conventional multiplier system.

FIG. 1 shows an example of a conventional multiplier system. Multiplier system 100 is a scalar machine that comprises computation unit 102, registers 104, cache 106, and memory 108. In operation, computation unit 102 uses registers 104 and cache 106 to retrieve data stored in memory 108. Typically, computation unit 102 is a microprocessor, such as a CPU or GPU, capable of performing various computational procedures including matrix multiplication on input matrices to obtain a resultant matrix, e.g., by converting multiplications into additions and outputting the result into some internal register.

For example, a dot product that represents an output pixel of an image is typically generated by dot-multiplying individual matrix elements from two matrices to obtain partial results, which are then added to obtain the final dot product. A multiplication of individual matrix elements, i.e., a scalar multiplication, is typically performed on individual data elements by breaking up the dot multiplication into a series of individual sub-operations. As a result, partial products have to be stored and fetched from one or more of registers 104, cache 106, and memory 108 to complete a single arithmetic operation.

Computationally demanding applications, such as a convolution, oftentimes require a software function be embedded in computation unit 102 and used to convert convolution operations into alternate matrix-multiply operations. This is accomplished by rearranging and reformatting data into two matrices that then can be raw matrix-multiplied. However, there exists no mechanism to efficiently share or reuse data in scalar machine 100, such that data necessary to execute each scalar operation has to be re-stored and re-fetched from registers many times. The complexity and managerial overhead of these operations becomes significantly greater as the amount of image data subject to convolution operations increases.

The inability to reuse much of the data in scalar machine 100 coupled with the added and inefficient steps of storing and fetching intermediate results from registers 104, cache 106, and memory 108 to complete an arithmetic operation are only some of the shortcoming of existing systems, such as multiplier system 100.

Accordingly, what is needed are high-computational-throughput systems and methods that can perform matrix mathematical operations quickly and efficiently.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures may be not to scale.

DETAILED DESCRIPTION OF EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof. Many components are be formed through interconnection of many subcomponents. Subcomponents may be selected that are logically different in operation from what is shown herein, where these logically different subcomponents can be combined in the aggregate with other subcomponents provide similar or identical functionality at the aggregated component level to that described herein (e.g., active high signals can be active low, AND gates replaced with inverted-input NOR gates, etc).

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists that follow are examples and not meant to be limited to the listed items and may include subsets or supersets of the items along with additional items. Any headings used herein are for organizational purposes only and shall not be used to limit the scope of the description or any claims. Each document mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

Although embodiments herein are discussed mainly in the context of convolutions, one of skill in the art will appreciate that a deconvolution and other matrix operations can also be structured as a matrix-matrix type multiply operation and, thus, the principles of the present invention are equally applicable to deconvolutions. Furthermore, other types of mathematical operations may be implemented in accordance with various embodiments of this disclosure.

Figure 2:
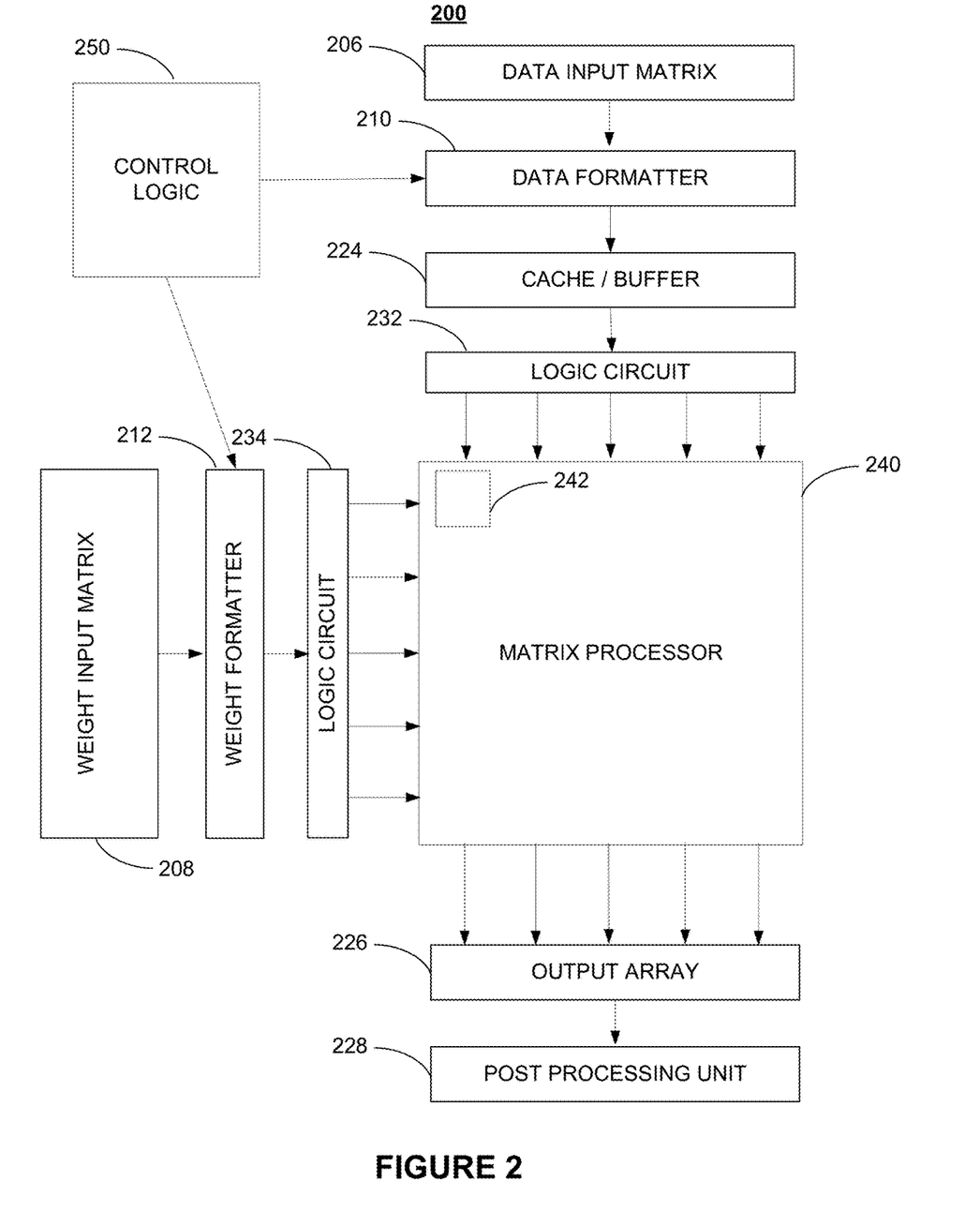
FIG. 2 illustrates and exemplary matrix processor architecture for performing arithmetic operations according to various embodiments of the present disclosure.

FIG. 2 illustrates an exemplary matrix processor architecture for performing arithmetic operations according to various embodiments of the present disclosure. System 200 comprises logic circuit 232 234, cache/buffer 224, data formatter 210, weight formatter 212, data input matrix 206, weight input matrix 208, matrix processor 240, output array 226, post processing units 228, and control logic 250. Matrix processor 240 comprises a plurality of sub-circuits 242 which contain Arithmetic Logic Units (ALUs), registers and, in some embodiments, encoders (such as booth encoders). Logic circuit 232 may be a circuit that represents N input operators and data registers. Logic circuit 234 may be circuitry that inputs M weight operands into matrix processor 240. Logic circuit 232 may be circuitry that input image data operands into matrix processor 240. Weight input matrix 208 and data input matrix 206 may be stored in various types of memory including SRAM devices. One skilled in the art will recognize that various types of operands may be input into the matrix processor 240.

In operation according to certain embodiments, system 200 accelerates convolution operations by reducing redundant operations within the systems and implementing hardware specific logic to perform certain mathematical operations across a large set of data and weights. This acceleration is a direct result of methods (and corresponding hardware components) that retrieve and input image data and weights to the matrix processor 240 as well as timing mathematical operations within the matrix processor 240 on a large scale.

In embodiments, formatters 210 212, which in example in FIG. 2 are implemented as in-line formatters. In certain embodiments, formatters 210 212 are discrete components and in other embodiments the formatters 210 212 are integrated together and/or with one or more other components. Each is implemented in hardware and converts a matrix to a vector on operands to be operated upon within the matrix processor 240. In other embodiments, formatters 210 212 are implemented in software, although this typically produces a loss in speed. Data formatter 210 converts two-dimensional or three-dimensional (e.g., a 3×3×3 cube) data comprising data input matrix 206 into a single vector or string that may be represented by a row or column, thereby, linearizing or vectorizing data input matrix 206. In detail, formatter 210 receives data input matrix 206 and prepares input data to be processed by matrix processor 240. In embodiments, this is accomplished by mapping parameters of the data input matrix 206 into a suitable format according to the hardware requirements of matrix processor 240 such that matrix processor 240 can efficiently perform a matrix multiply as part of a convolution calculation when generating output pixels.

As an example, assuming matrix processor 240 comprises 96 rows and 96 columns, data mapped into a 96×96 format would cause matrix processor 240 to be utilized to its full computational capacity and, thus, provide a preferred efficiency. In that case, formatter 210 should produce an output that is 96-columns wide. Similarly, formatter 212 should produce an output that is 96-rows wide based on the weight input matrix 208.

In embodiments, formatter 210 uses a number of multiplexers or switches to fetch some or all of data input matrix 206 and choose different elements therefrom in order to produce data that is then lined up according to the columns of matrix processor 240. In embodiments, the selection ensures that the appropriate data from data input matrix 206 is passed to each of the columns at defined clock cycles. In embodiments, if weights are static, they may be pre-formatted offline, stored in memory, fetched only once, and fed directly into matrix processor 240 in a modified, vectorized format without the use of formatter 212. In other embodiments, weights may be dynamically adjusted and fed into matrix processor 240 in accordance with various formatting and fetching operations. In embodiments, matrix processor 240 allows for column and row inputs of varying sizes. That is, matrix processor 240 is designed to compute N×M computations of arbitrary size.

In other embodiments, if the number of columns of the matrix processor 240 is limited (for example to N columns) such that the number of columns in the data input matrix 206 (for example X) is greater than the number of columns of the matrix processor 240 (i.e., X>N), then the control logic 250 may split the data input matrix 206 into multiple submatricies with each submatrix computed by a matrix processor 240. In such instances, each matrix processor 240 may be running in a different thread. For example, if data input matrix 206 consists of 192×96 data points, and the matrix processor has 96 columns and 96 rows (i.e., 96×96 computations may occur in one clock cycle), the control logic 250 may split the data input matrix 206 into two submatricies (such as the left half of the data input matrix 206 and the right half of the data input matrix 206). Each submatrix will consist of 96×96 data points. Each separately threaded matrix processor 240 can compute the output channels for the submatrix sent to it with results placed into the final output array 260, which must be large enough to hold the values from all channels (that is 192 values). More generally, data input matrix 206 may be split into any number of submatricies and sent to different matrix processors 240, each running in a separate thread. As with the output array 226, the data input matrix 206, data formatter 210, cache/buffer 224, logic circuit 232, and post processing unit 228 must similarly be able to accommodate the larger data.

In alternative embodiments, a CNN may be computed between multiple matrix processors 240 by having control logic 250 splitting the computations along the inner product. The segments of the inner product are computed, each in a different matrix processor 240, and then the input products added together to compute the output vector, which is then stored in output array 260.

Unlike common software implementations of formatting functions that are performed by a CPU or GPU to convert a convolution operation into a matrix-multiply by rearranging data to an alternate format that is suitable for a fast matrix multiplication, various hardware implementations of the present disclosure re-format data on the fly and make it available for execution, e.g., 96 pieces of data every cycle, in effect, allowing a very large number of elements of a matrix to be processed in parallel, thus efficiently mapping data to a matrix operation. In embodiments, for 2N fetched input data $2N^2$ compute data may be obtained in a single clock cycle. This architecture results in a meaningful improvement in processing speeds by effectively reducing the number of read or fetch operations employed in a typical processor architecture as well as providing a paralleled, efficient and synchronized process in performing a large number of mathematical operations across a plurality of data inputs.

In embodiments, to increase efficiency of matrix processor 240 that may have any arbitrary number of columns and rows, formatter 212 214 may reformat different shapes of input matrices data into the columns and rows suitable for matrix processor 240. In embodiments, formatting is performed dynamically to accommodate processing of matrices having different input sizes. In embodiments, the reformatted matrixes comprising input channels are fed into cache/buffer 224.

Cache/Buffer 224 may fetch data from data input matrix 206 only 1/k times as various pieces of data may be reused, where k is the convolution kernel width. For example, for any given cycle, once a row is fetched, certain columns will have access to all the data in that row. In embodiments, cache/buffer 224 may be a local buffer that stores a local copy of data that may be reused by a convolution without having to re-access and read data from SRAM.

Once matrix processor 240 has completed a computation, a set of result may be shifted, e.g., from the accumulators in the bottom row of matrix processor 240, e.g., to output flip-flops (not shown) that effectively form a shift register that receive a dot product. In embodiments, pulling or shifting results into output array 226, e.g., one per clock cycle, from a row that corresponds to an output channel may be accomplished by a state machine (not shown). The state machine may perform additional operations on the output channel, for example, prior to sending data to SRAM and/or post processing unit 228. The internal operation of matrix processor 240 will be described in more detail below.

In embodiments, matrix processor 240 comprises shadow registers that enable parallel processing by storing a copy of the results that are passed through matrix processor 240 to output array 226. In embodiments, moving an operation result from output register to shadow register involves loading the next set of values into the ALUs.

Once an accumulation has completed, a convolution may commence and accumulation may start over before all of the data of a prior convolution is output to output array 226. As a result, in every clock cycle, the data in matrix processor 240 may move down by one row, such that for each cycle the last row may be output to output array 226. In effect, this mode of operation ensures that a new calculation may be made in each consecutive cycle without any interruptions and independent of additional processing operations, such as storing data in SRAM, etc.

Post processing unit 228 may comprise or interact with a number of devices (not shown), such as a hardware-accelerated pooling unit, a DRAM that may be part of a direct memory access ("DMA") that retrieves data from memory and stores data (e.g., weights and results) in SRAM, and the like. The devices may be partially or entirely controlled by control logic 250, which may also manage formatters 210 212 and other components within system 200.

Not shown in FIG. 2 are auxiliary devices that perform management functions, such as a sequencer that generates addresses for reading the data, writes the results, and keeps track of where system 200 is in the convolution in order to calculate from where to get and how to execute the data that will be used in a subsequent step of the convolution.

In certain embodiments, weight input matrix 208 is physically split and drives weights from two different sides of matrix processor 240, such that the two-dimensional array is split into two regions (e.g., a left-hand side and a right-hand side) that each receive a portion of the data in weight input matrix 208. Such an implementation reduces data latency by taking advantage of the fact that weights are known. In embodiments, in order to reduce peak power consumption, the timing of operations may be chosen such that multiplications of weight and data are spread out over a certain number of cycles. This efficient timing of operations results in a reduction of energy consuming steps including a decrease in the number of read operations performed by the matrix processor and improving the efficiency of data movement within the matrix (e.g., between sub-circuits).

In embodiments, a state machine (not shown) that is configured to identify redundant data may be employed. Identified redundant data may be reused across columns, such that the data does not need to be re-fetched. The state machine may be configured to determine how and where to shift data that is to be executed, e.g., based on inputs related to image size, filter size, stride, number of channels, and similar parameters.

In embodiments, a booth encoder is shared across a number of elements in the multiplication architecture of matrix processor 240. The booth encoder may be any booth encoder known in the art and may be used to multiply two numbers and encode one of the two numbers, e.g., from an 8-bit value to a 12-bit or any other value that makes multiplication operations easier on the multiplier logic and, thus, faster. In embodiments, the booth encoder may be applied in parallel across an entire row so as to share the same encoded, alternate weight value across all columns. By loading an operand across all columns, a multiplication may be performed in a single clock cycle across an entire row. The cost for leveraging re-encoding to share the same data (e.g., weights) across for N computational elements is thus paid only once for each column (or row). In comparison, in existing computing architectures, every single scalar would require a booth encoder for every single multiplication operation.

Figure 3:
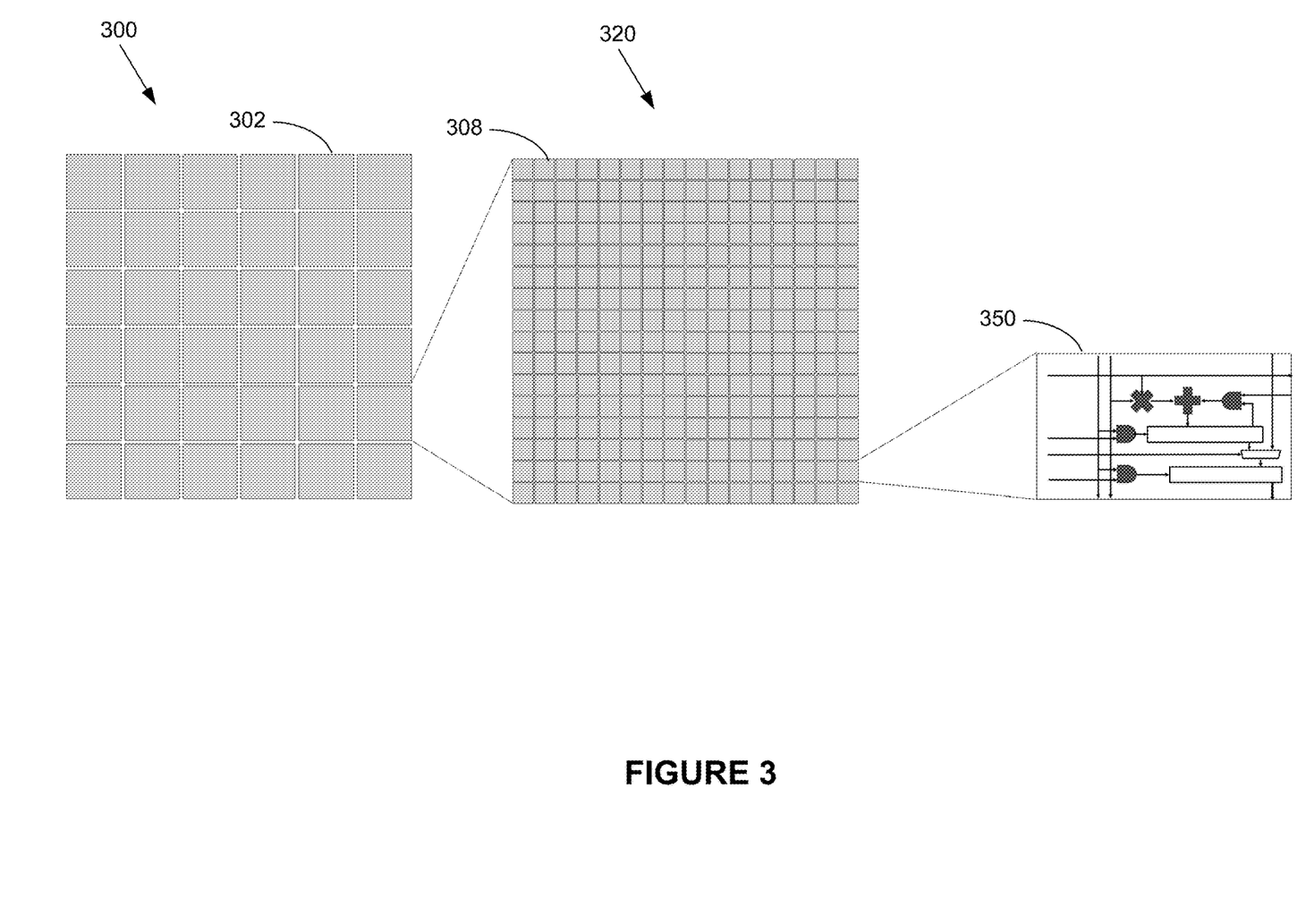
FIG. 3 illustrates details of an exemplary configuration of the matrix processor architecture shown in FIG. 2.

FIG. 3 illustrates details of an exemplary configuration of the matrix processor architecture shown in FIG. 2. In embodiments, matrix processor 300 may accommodate a predetermined vector length on each axis. As depicted in FIG. 3, matrix processor 300 may comprise an array of 6×6 tiles 302 that are arranged in a matrix format. Each tile 302 may comprise a matrix 320 that, in turn, comprises sub-circuits circuits 350. As discussed in detail below with reference to FIG. 4, each sub-circuit circuit 350 may be a cell capable of performing arithmetic operations. In embodiments, sub-circuit circuit 350 performs simultaneously multiplication, accumulation, and shift operations.

In embodiments, arithmetic operations are parallelized by utilizing multiple rows and columns of matrix processor 300 to generate an N×N tile output. For example, a given row size of 96 and a corresponding column size of 96 facilitate an output of 2*9216 mathematical calculations. In other embodiments, the number of rows and columns may be different. That is, there may be N rows and M columns and an N×M tile output may be generated. For example, for a row size of 96 and a corresponding column size of 192, an output of 2*18,432 calculations is generated in a single clock cycle.

Figure 4:
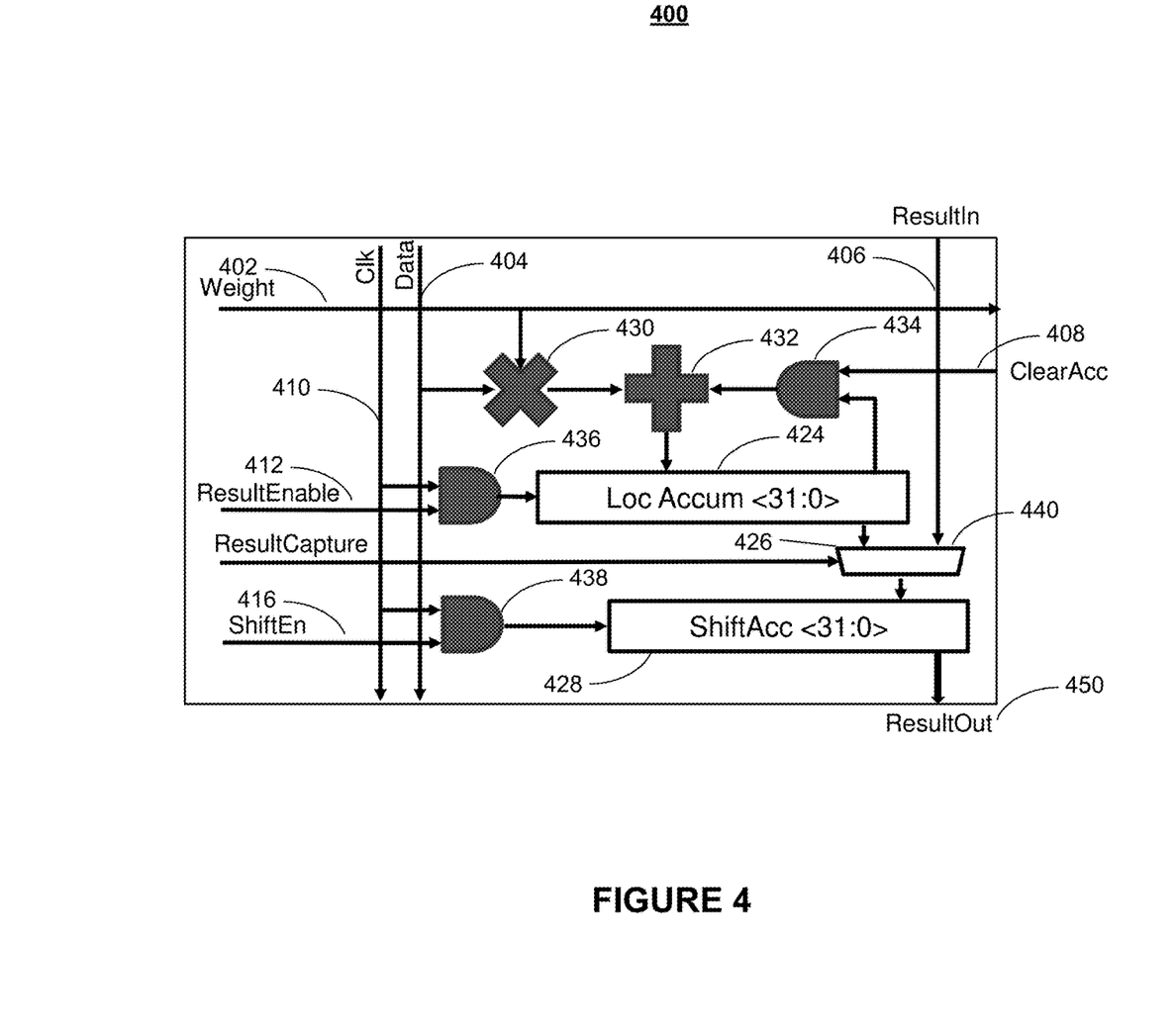
FIG. 4 illustrates an exemplary multiply-and-add circuit implementation of the logic circuit shown in FIG. 3.

FIG. 4 illustrates an exemplary multiply-and-add circuit implementation of the sub-circuit shown in FIG. 3. As depicted in FIG. 4, multiply-and-add circuit 400 comprises multiplier 430, adder 432, logic 434 436 438, accumulator 424, shadow register 428, and output register 440. In embodiments, accumulator 424 may be implemented as an accumulation register.

In embodiments, accumulator 424 may comprise a set of ALUs that comprise registers and shadow register 428 that may be configured to receive the outputs of the ALUs.

In operation, multiplier 430 receives and multiplies weights 402 and data 404 to generate products therefrom. Each product may be provided to adder 432 that, in response to receiving the product from multiplier 430, adds the product to the current value of the accumulator 424.

In embodiments, accumulator 424 generates an accumulated value that is stored, e.g., in output register 440. The accumulated value is the result of a convolution and, as mentioned with reference to FIG. 2, may correspond to the dot product of two formatted matrices.

In embodiments, a copy of the result in output register 440 may be provided to shadow register 428, which may output result 450, such that accumulator 424 can be accessed again to commence new calculations. In embodiments, multiply-and-add circuit 400 in FIG. 4 may perform a multiplication, an addition operation, and a shift operation at the same time, i.e., within a single cycle, thereby doubling the total number of operations that occur each cycle.

In embodiments, ClearAcc signal 408 clears the contents of accumulator 424, e.g., when multiplier 430 performs a multiply operation, such that accumulation operations can start over. In embodiments, ResultEnable signal 412 is activated in response to a determination that data 404 is valid. It is understood that accumulator 424 may accumulate and save data, accumulate and clear data, or just clear data.

In embodiments, results are moved from output register 440 to shadow register 428 in a single clock cycle, i.e., without the need of intermediate execute and save operations.

Figure 5:
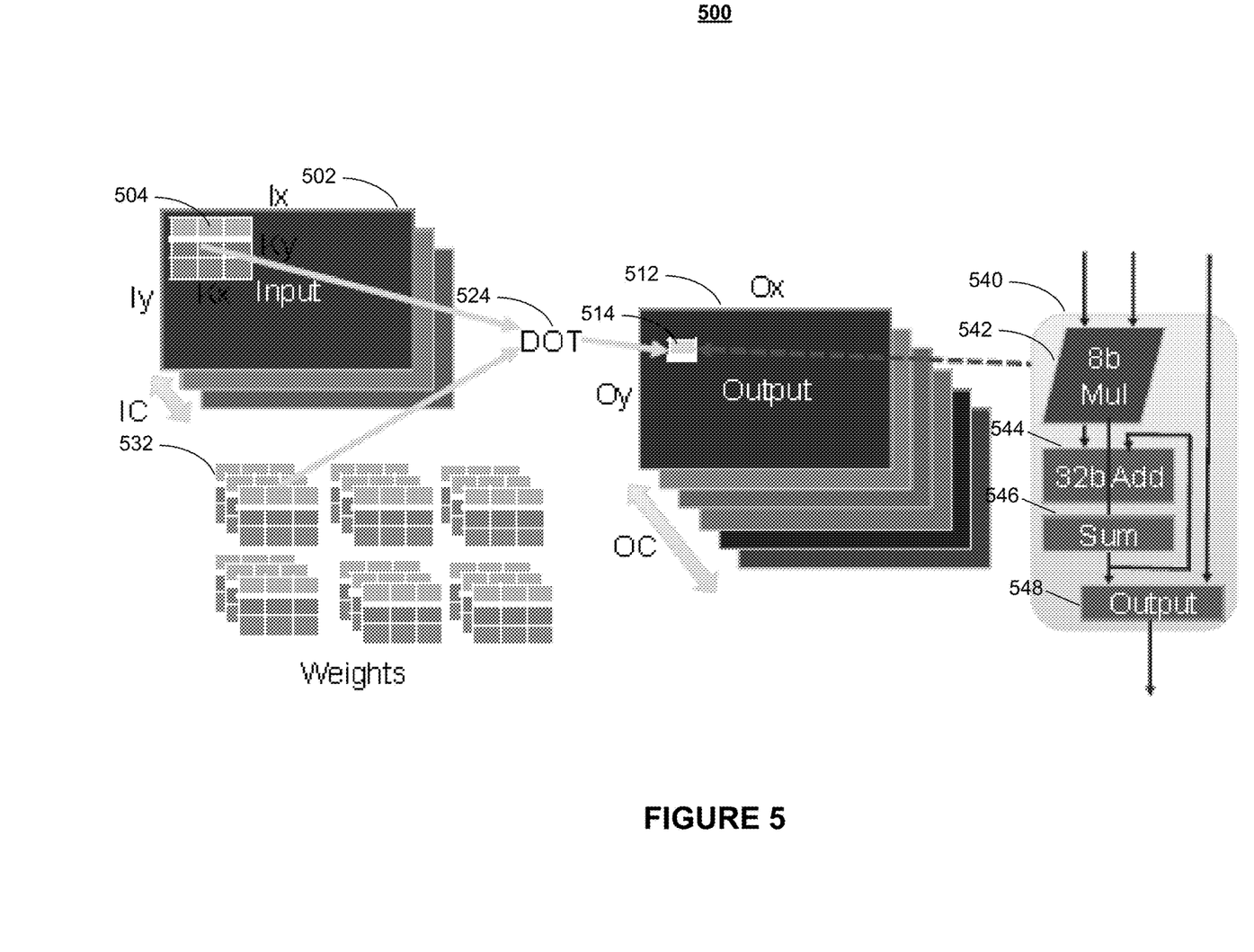
FIG. 5 illustrates an exemplary convolution operation according to various embodiments of the present disclosure.

FIG. 5 illustrates an exemplary convolution operation according to various embodiments of the present disclosure. Convolution 500 comprises input channels IC of input image 502, weights 532, dot product 514, output channels OC, and accumulator 540.

In embodiments, convolution operation 500 applies individual filters (i.e., weights) 532 to input image 502, e.g., to detect small features within input image 502. By analyzing a sequence of different features in a different order, macro features may then be identified in input image 502. In other embodiments, input 502 is non-image data. For example, input 502 may be non-image sensor data, such as ultrasonic, radar, LIDAR, or other sensor data. Input 502 may also be general mathematical computations or any other types of data known to one of skill in the art.

Convolution 500 may use a different set of weights 532 for each input channel IC, as each input channel IC may contain a different set of information, and each weight matrix 532 may be designed to help identify a different feature. In embodiments, convolution 500 multiplies a rectangular input matrix 504 with a rectangular weight matrix 532 to obtain partial dot products. The partial dot products may then summed by adder 546 in order to generate an accumulated dot product 514 (i.e., an integer) that represents an output pixel 514 in the output image.

In embodiments, each pixel in output channel OC is generated by multiplier 542 and adder 544. In embodiments, the value of the partial dot products correspond to the application of weight matrix 532 in its entirety to area 504 of the input image 502. In other words, each weight 532 is dot multiplied by multiplier 542 with area 504 to produce a partial dot product, then the partial dot products are accumulated in accumulator 540 to generate an accumulated output that represents the convolution.

One or more input channels IC, e.g., one for each color (e.g., RGB) may be used. For example, each convolution may use weights 532 that represent three different matrices, one for each color. Each output channel OC 512 may be generated using a different filter or weight 532 that represents a different feature in input data 502. The number of output channels may depend on the number of features. The number of convolutions is equal to the number of output channels OC times the number of input channels IC, and each convolution may have N convolutions for each input channel IC. One skilled in the art will recognize that the number and type of input channels may vary and may include color and/or clear inputs.

As depicted in FIG. 5, input matrix 504 is a Kx×Ky (i.e., 3×3) matrix that may be combined with a 3×3 weight matrix 532 across 3 input channels, i.e., 3×3×IC, such that the depths match and produce a single element, dot product 514, in the output plane. Each dot product 514 in output channel 512 is the result of a dot multiplication.

Figure 6:
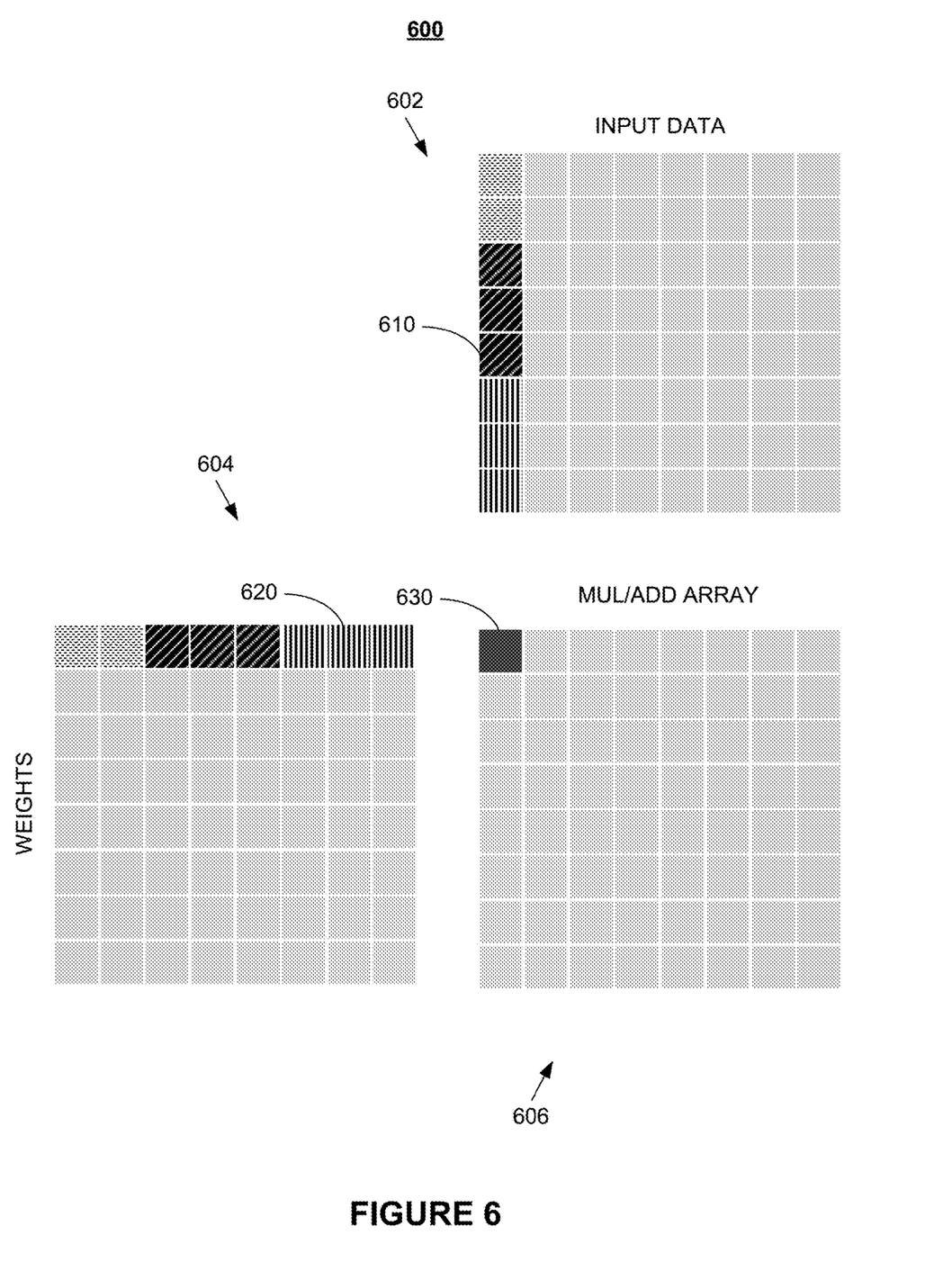
FIG. 6 through FIG. 8 illustrate details of an exemplary convolution operation according to various embodiments of the present disclosure.
Figure 7:
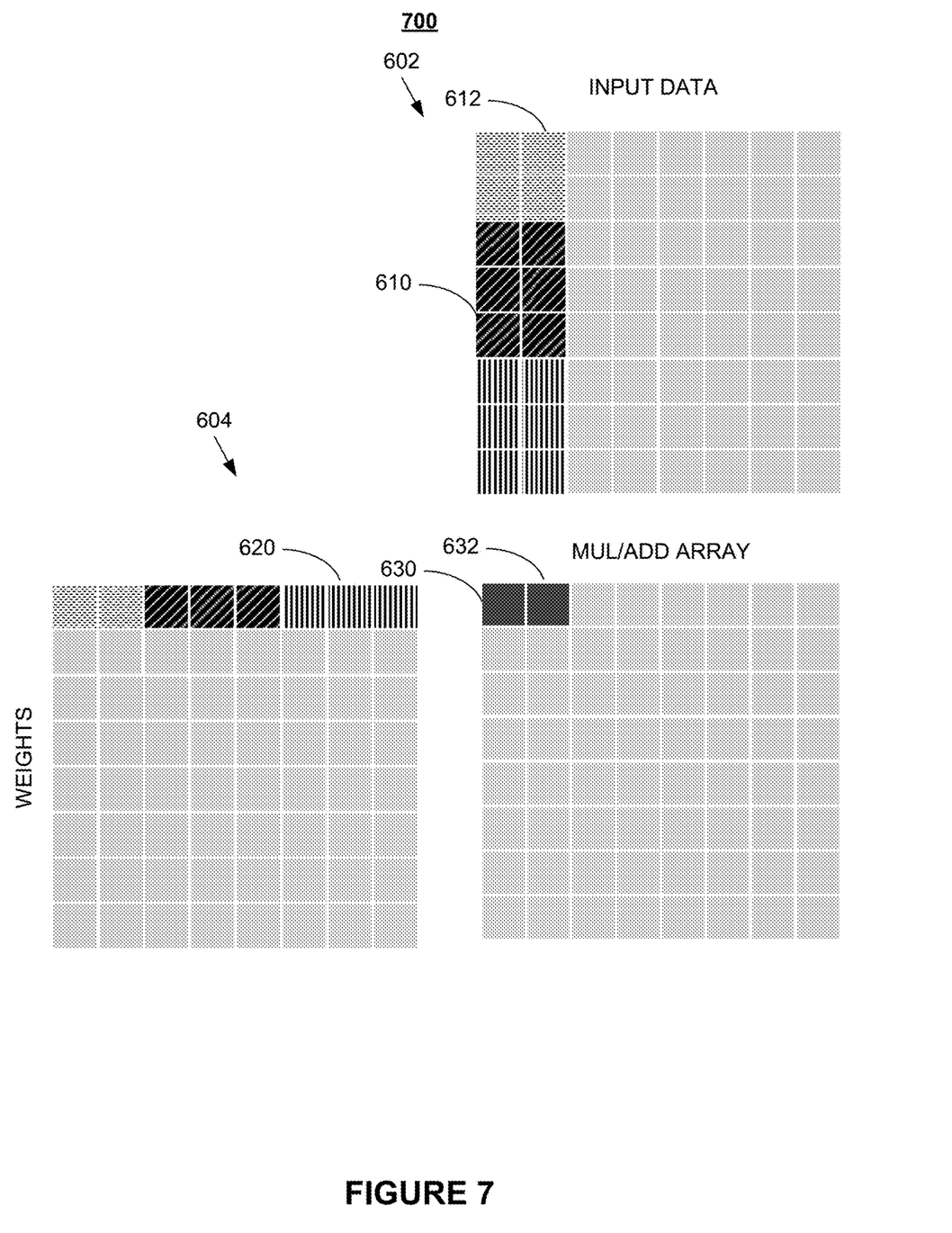
Figure 8:
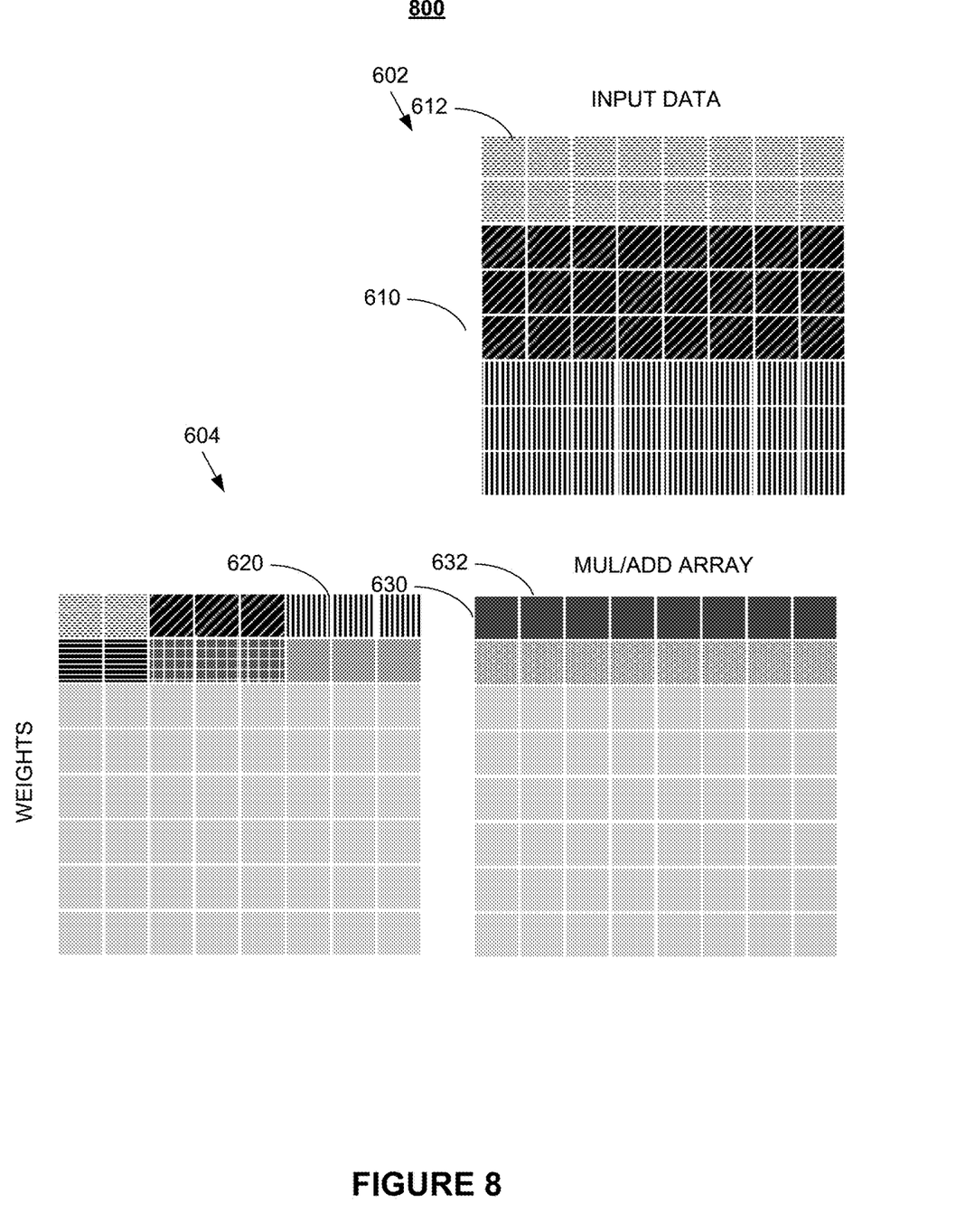

FIG. 6 through FIG. 8 illustrate details of an exemplary convolution operation according to various embodiments of the present disclosure. Convolution 600 comprises input data matrix 602, weight data matrix 604, array 606, and dot product 630. In embodiments, array 606 is a matrix processor architecture as shown in FIG. 2 and FIG. 3.

Input data matrix 602 in FIG. 6 comprises column 610 that, in embodiments, may be obtained by linearizing an input matrix, such as rectangular input matrix 504 shown in FIG. 5, to obtain a vectorized form of the input matrix. Similarly, weight data matrix 604 comprises row 620 that may be a vectorized form of a weight matrix, such as rectangular weight matrix 532 in FIG. 5. As an example, a 3×3 input matrix and 3 input channels may be re-formatted into a vector that comprises 3×3×3=27 elements from which a 27-element column 610 may be produced for use in input data matrix 602. Conversely, a 3×3 weight matrix for the same 3 input channels may be used to generate a 27-element row 620 for use in weight data matrix 604. One skilled in the art will recognize that the sizes of input matrices and number of input channels may vary across different applications.

In embodiments, the input channels and input weights drawn as rectangles in FIG. 5 are reformatted, e.g., by the formatter discussed with reference to FIG. 2, into a vector formats (e.g., vectors having 96 elements) that are provided to a matrix multiplier/processor (denoted as element 240 FIG. 2), such that a 96×96 element dot product operation can be performed in parallel. In detail, input data 504 and input weights 532 shown in FIG. 5 as rectangles for each input channel are reformatted into vector formats.

In embodiments, the resulting vector formats, illustrated in FIG. 6 as input data 602 and input weights 604 (e.g., each having comprising 96 elements) are provided to matrix processor or matrix multiplier 240 that performs a 96×96 element dot product operation in parallel. In embodiments, in the calculation of output channels, the same output pixels are produced using the same set of input data but different set of weights (i.e., filters), such that by reading the input data once many output channels can be generated at once. As stated above, it is understood that the number of input and output channels may be arbitrarily chosen.

It is further understood that input data matrix 602, weight data matrix 604, and array 606 may have different numbers of columns and rows as those depicted in FIG. 6. In particular, the shapes of input data matrix 602 and weight data matrix 604 may be formatted such as to accommodate the columns and rows of any arbitrate configuration of array 606. In addition, in circumstances in which weight data matrix 604 is known then row 620 may be generated and stored in a vectorized format without the use of a formatter.

In embodiments, dot product 630 in FIG. 6 is generated by dot-multiplying a vector corresponding to column 610 with a vector corresponding to row 620. In embodiments, as shown in FIG. 7, the next dot product 632 may be obtained by dot-multiplying a vector corresponding to column 612 with the vector corresponding to row 620. As those of skill in the art will recognize, once all dot products in the first row of array 606 are filled, the dot product of the second row of array 606 may be calculated by dot-multiplying the elements in first column 610 of input data matrix 602 with the second row of weight data matrix 604, etc.

It is important to note that FIG. 6 through FIG. 8 merely serve illustrative purposes and that the abovementioned dot-multiplications may be simultaneously performed to generate a one-shot matrix-matrix multiply operation.

Figure 9:
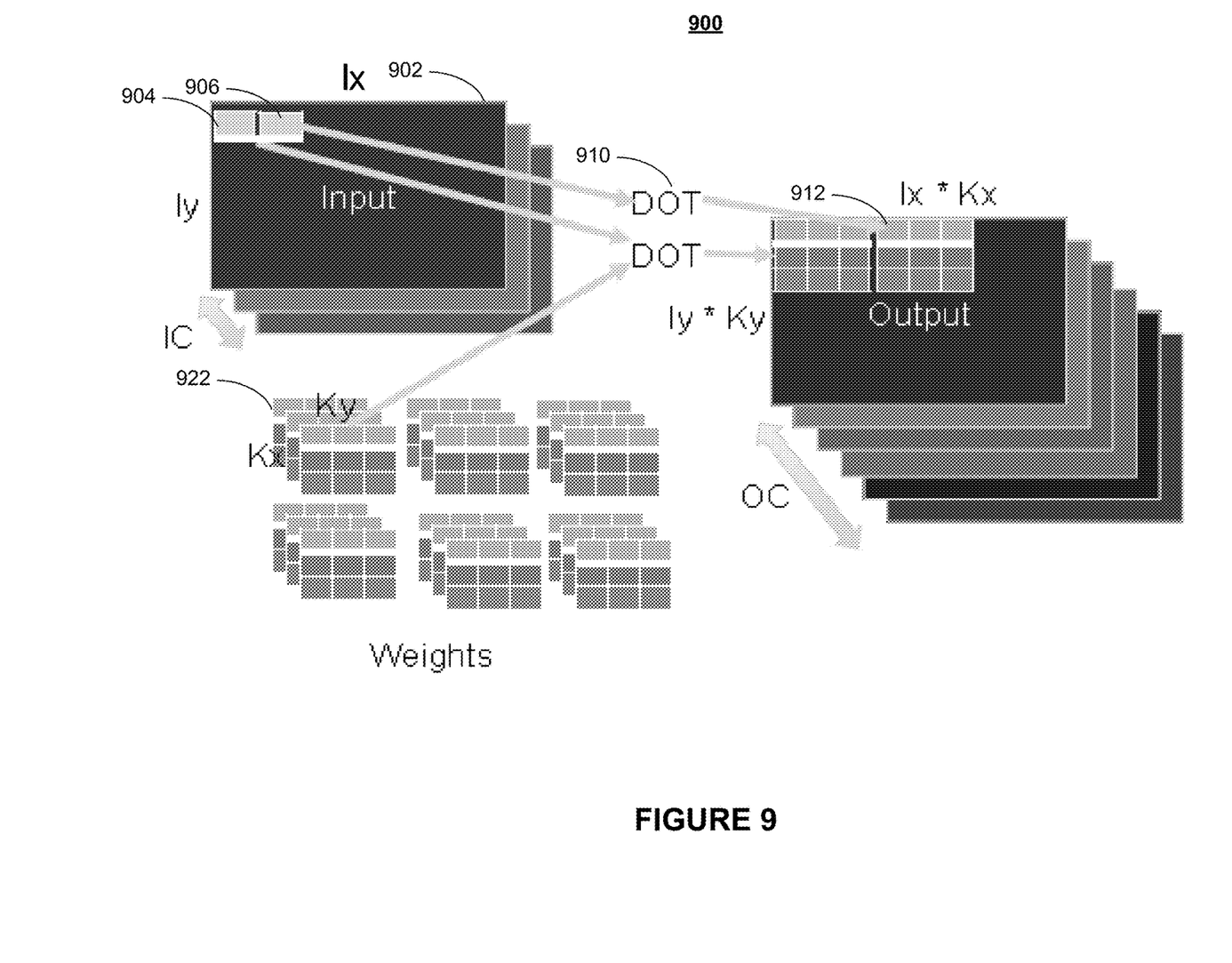
FIG. 9 illustrates an exemplary deconvolution operation according to various embodiments of the present disclosure.

FIG. 9 illustrates an exemplary deconvolution operation according to various embodiments of the present disclosure. Deconvolution system 900 comprises input channels IC of input image 902, weights 922, dot product 904 906, and output channels OC. A person of skill in the art will recognize that, the deconvolution operation 900 is, in effect, is a mathematical transposition (approximately the inverse) of the convolution operation, for example, the convolution shown in FIG. 5. One of skill in the art will further recognize that a neural network may be used to learn deconvolution operation 900 by applying procedures similar to those used for ordinary convolutional neural networks. For purposes of brevity, a description or functions of components similar to those in FIG. 5 is not repeated here.

In embodiments, deconvolution operation 900 in FIG. 9 reassembles matrices 912 by deconstructing dot product 904 906 using weights 922. As with a convolution operation, deconvolution 900 may use a different set of weights 922 for each input channel IC. In embodiments, deconvolution 900 may be advantageously applied to an image to perform image deconvolution, for example to improve robustness against artifacts. Other applications may include analysis and restoration of image data, and the like.

Figure 10:
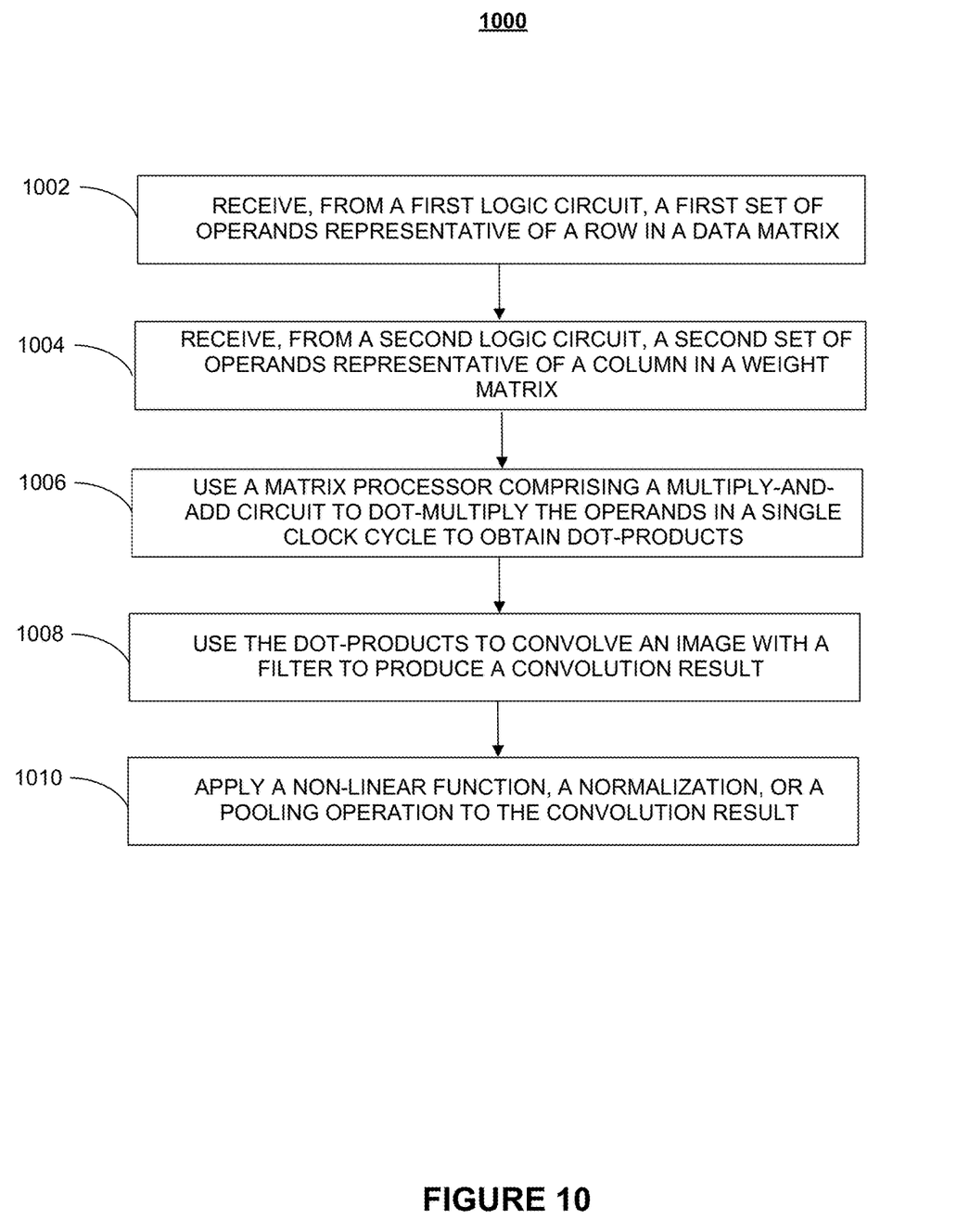
FIG. 10 illustrates a process for performing arithmetic operations to make convolutional neural networks faster, according to various embodiments of the present disclosure.

FIG. 10 illustrates a process for performing arithmetic operations to accelerate convolutional neural networks according to various embodiments of the present disclosure.

Process 1000 for performing arithmetic operations begins at step 1002 when a first set of operands that may be representative of a row in a data matrix is received from a first logic circuit. This first set of operands may be vectorized such that the operands are aligned with inputs into a matrix processor. In certain embodiments, the size of the vectorized operands is directly related to the number of inputs into a matrix processor along on axis.

At step 1004, a second set of operands that may be representative of a column in a weight matrix is received from a second logic circuit. This second set of operands may be vectorized such that the operands are aligned within corresponding inputs into the matrix processor. In certain embodiments, the size of the vectorized operands is directly related to the number of inputs into the matrix process along a different axis.

At step 1006, the first set of operands is dot-multiplied with the second set of operands to obtain one or more dot-products. In certain embodiments, this set operation across the sets of operands is performed in a single clock cycle.

At step 1008, the dot-products may be used to convolve an image with a filter to produce a convolution result.

At step 1010, the convolution result is further processed to enhance the image output. This further processing may occur using a non-linear function, a normalization operation or a pooling operation.

One skilled in the art will recognize no computing system or programming language is critical to the practice of the present invention. One skilled in the art will also recognize that a number of the elements described above may be physically and/or functionally separated into sub-modules or combined together.

It shall be noted that elements of the claims below may be arranged differently including having multiple dependencies, configurations, and combinations. For example, in embodiments, the subject matter of various claims may be combined with other claims.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

The invention claimed is:

1. A matrix processor for accelerating convolutions in a neural network, the matrix processor comprising:
   a first input circuit arranged in a first dimension of a two-dimensional array, the first input circuit being coupled to receive N operands from a first logic circuit, the N operands being formatted in accordance with a first width related to the first dimension, wherein the N operands represent a first input region of a plurality of input regions obtained from image data;
   a second input circuit arranged in a second dimension of the two-dimensional array, the second input circuit coupled to receive M operands from a second logic circuit, the M operands being formatted in accordance with a second width related to the second dimension, wherein the M operands represent first weight values of a first filter of a plurality of filters; and
   a plurality of sub-circuits coupled to receive the N operands and the M operands, at least a subset of the plurality of sub-circuits comprising an arithmetic logic unit, an accumulator and a shadow register, the sub-circuits coupled within the two-dimensional array to perform a dot product calculation of the N operands and the M operands, such that the first input region is convolved with the first filter, wherein remaining input regions of the plurality of input regions are received and convolved with the first filter,
   and wherein the sub-circuits are configured to receive, from the second input circuit, second weight values of a second filter of the plurality of filters.

2. The matrix processor according to claim 1 wherein the arithmetic logic unit comprises a multiply-and-add circuit to generate the dot product.

3. The matrix processor according to claim 1 wherein at least some of the sub-circuits comprise an encoding element configured to encode values representing one or more of the M operands.

4. The matrix processor according to claim 3 wherein the encoding element is a booth encoder.

5. The matrix processor according to claim 1 wherein the N operands are formatted from a data input matrix.

6. The matrix processor according to claim 1 further comprising a state machine that uses at least one of a filter size and a stride to determine reusable operands within the N operands or the M operands.

7. The matrix processor according to claim 1 wherein accelerated processing speed is achieved by a reduction in read operations from a cache and accelerated data throughput via the plurality of sub-circuits.

8. A system for accelerating convolutions in a neural network, the system comprising:
   a first logic circuit that generates N operands;
   a first input circuit arranged in a first dimension of a two-dimensional array, the first input circuit being coupled to receive the N operands from the first logic circuit wherein the N operands represent a first input region of a plurality of input regions obtained from image data;
   a second logic circuit that generates M operands;
   a second input circuit arranged in a second dimension of the two-dimensional array, the second input circuit being coupled to receive M operands from the second logic circuit, wherein the M operands represent first weight values of a first filter of a plurality of filters;
   a matrix processor comprising a plurality of sub-circuits, the plurality of sub-circuits configured to perform dot-multiplications of the N operands and the M operands to generate dot-products, such that the first input region is convolved with the first filter, at least a subset of the plurality of sub-circuits comprising an arithmetic logic unit, an accumulator and a shadow register, wherein remaining input regions of the plurality of input regions are received and convolved with the first filter,
   and wherein the sub-circuits are configured to receive, from the second input circuit, second weight values of a second filter of the plurality of filters; and
   an output array coupled to the two-dimensional array, the two-dimensional array configured to use the dot-products to generate a result.

9. The system according to claim 8 wherein the N operands are formatted from a data input matrix into a first vector and the M operands are formatted from a weight input matrix into a second vector, the data input matrix including the plurality of input regions and the weight input matrix including the plurality of filters.

10. The system according to claim 9 wherein the first logic circuit comprises a plurality of data registers that store the N operands, the plurality of data registers having a first width corresponding to the first dimension of the two dimensional array and the second logic circuit comprises a plurality of weight registers that store the M weight operands, the plurality of weight registers having a second width corresponding to the second dimension of the two dimensional array.

11. The system according to claim 10 wherein the first width corresponds to a number of cycles that generate the result.

12. The system according to claim 10 wherein the data register and the weights register are accessed only once to fetch respective a first and second number of elements.

13. The system according to claim 8 wherein the shadow registers move data, in one or more clock cycles, to a shift register.

14. The system according to claim 9 further comprising a buffer coupled to at least one of the data input matrix and the weight input matrix, the buffer stores a copy of recently used data to enable reuse without refetching in subsequent cycles.

15. The system according to claim 8 wherein the result is included in an output matrix, the result corresponding corresponds to an application of the first filter to the first input region.

16. The system according to claim 8 further comprising a state machine that uses at least one of a filter size and a stride to identify reusable data.

17. A method for using a matrix multiplication circuit to make convolutional neural networks faster, the method comprising:
   receiving, from a first logic circuit, a first set of operands representative of a row in a data matrix, wherein the first set of operands represent a first input region of a plurality of input regions obtained from image data;

receiving, from a second logic circuit, a second set of operands representative of a column in a weight matrix, wherein the column represents a first filter of a plurality of filters;

using a plurality of sub-circuits, which comprise an arithmetic logic unit, an accumulator and a shadow register, to dot-multiply the first set of operands with the second set of operands to obtain one or more dot-products; and using the dot-products to convolve the first input region with the first filter to produce a convolution result, wherein remaining input regions of the plurality of input regions are convolved, using the sub-circuits, with the first filter, and wherein subsequent to the plurality of input regions being convolved with the first filter, a second filter of the plurality of filters is convolved, using the sub-circuits, with the first input region.

18. The method according to claim 17 wherein convolving the image comprises processing the one or more dot-products by a convolution layer to generate a layer output.

19. The method according to claim 18 wherein generating the layer output comprises applying one of a non-linear function, a normalization, and a pooling to the convolution result.

20. The matrix processor according to claim 1, wherein the shadow register represents a shift register configured to output a result of the dot product calculation received from the accumulator.

21. The system according to claim 13, wherein the shadow register is configured to receive information from the accumulator.

* * * * *